Aug. 12, 1930.  J. M. BLACK  1,772,658
MEAT VISE
Filed April 5, 1928
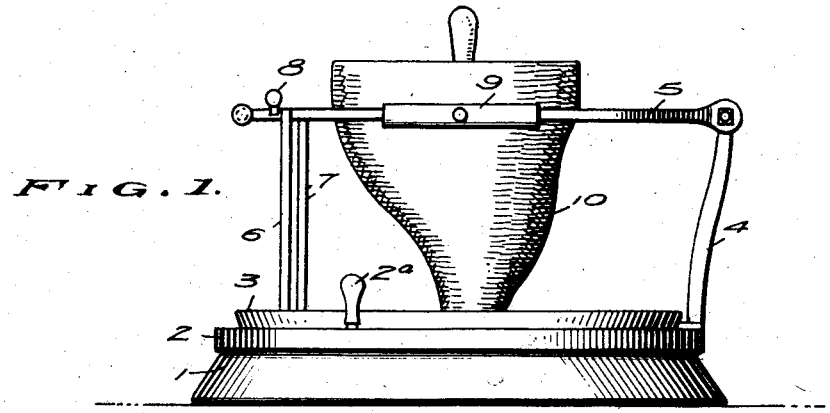
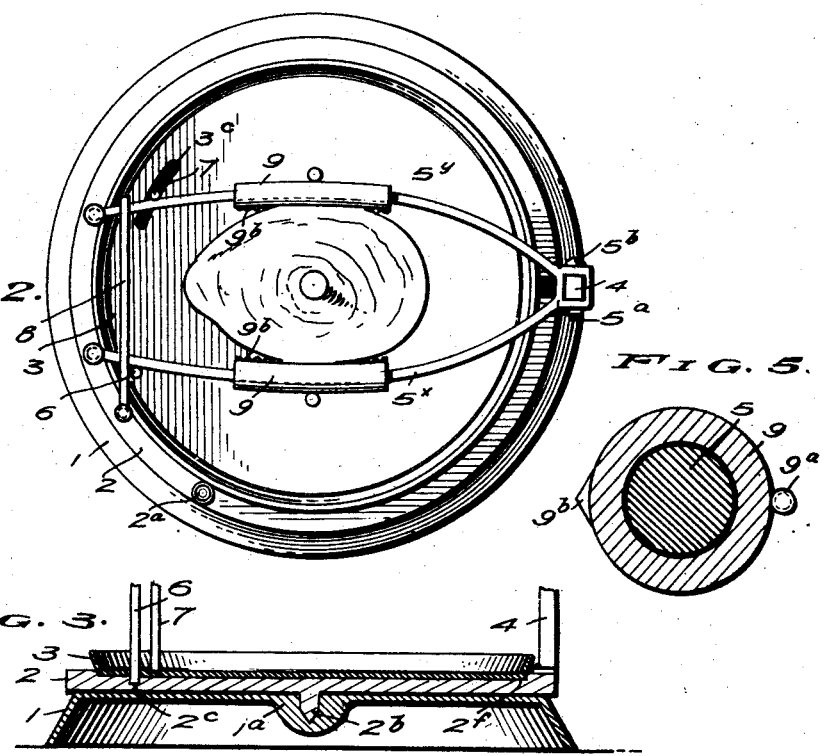
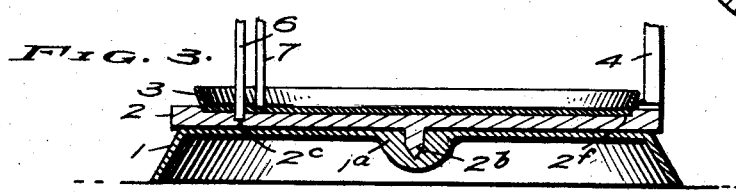
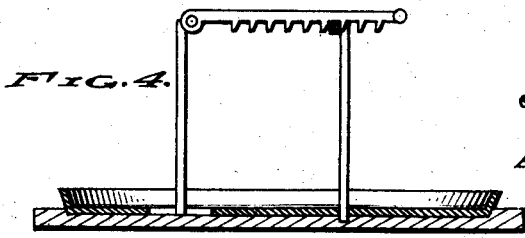
INVENTOR
James M. Black
BY F. L. Peyton, Jr.
ATTORNEY Patented Aug. 12, 1930

1,772,658

UNITED STATES PATENT OFFICE

JAMES M. BLACK, OF JACKSON, MISSISSIPPI

MEAT VISE

Application filed April 5, 1928. Serial No. 267,544.

In the slicing of baked ham, a leg of beef or other meat, it has been necessary, in the past, to lay the meat on a slab and slice downward or cross-wise, sometimes across the meat grain. This manner of slicing meat is wasteful, for the reason that an even slice cannot always be cut and often small shreds or chunks of meat are severed from the whole.

This ancient manner of cutting meat has also had the undesirable feature of giving an un-even cut, and, recently, has been somewhat superceded by automatic cutting machines. Such automatic machines, however, are not desirable for slicing meat for the table, as they generally have been found not to cut meat satisfying to taste; and also because their cost is almost prohibitive to delicatessens and like establishments. It is, therefore, to meet a popular demand that my invention has been devised.

Various uses and advantages of my invention not here mentioned will be in part obvious from an inspection of the accompanying drawing and in part will be more fully set forth in the following particular description of one form of the device.

Figure 1, represents a side view of the device holding a ham.

Figure 2, represents a top plan thereof.

Figure 3, is a cross-section of Figure 1.

Figure 4, is a front view of the device, part in cross-section.

Figure 5, is a cross-section view of the jaw and adjustable dog.

As illustrated, my device comprises a base 1 on the top of which is the table 2. Resting on the table is a pan 3. Attached at one side of the table is the upright 4, to the upper extremity of which is hinged the vise jaws 5—5. The vise jaws are of U-shape and extend from the upright 4 horizontally over the table 2. At the opposite extremity of the jaws 5—5, from the upright 4, are the legs 6 and 7 extending downward from the jaws to the table 2. The jaws 5—5 are maintained in predetermined relation one to the other by the hasp 8.

A pin $2^b$ projects downward from the underside of the table and fits within the socket $1^a$ in the base 1. The upper surface of the table 2 is hollowed to a bowl $2^f$ wherein rests the pan 3. At the extreme side of the table is the handle $2^a$ by means of which the table may be revolved on the base with ease.

The leg 6 attached the jaw $5^x$ projects downward to a socket $2^c$ in the table 2 thereby affording additional rigidity to the jaws of the vise. The leg 7 attached the jaw $5^y$ is slightly shorter than the leg 6, so that while the lower extremity of leg 6 fits in the socket $2^c$, the extremity of the leg 7 rests on top of the table 2. On the jaw $5^y$ and adjacent the leg 7 there is hinged the hasp 8 which extends over the top of the jaw $5^x$ as disclosed in Figures 2 and 4.

The jaws $5^x$ and $5^y$ are preferably round with the end of the jaw $5^x$ squared to more easily prevent the teeth of the hasp 8 from slipping.

The pan 3 has a hole and a slot therein, the former adapted to receive the passage of the leg $5^x$ to the socket $2^c$ and the latter adapted to permit the leg $5^y$ to slide therein, in order that the one element may be adjusted with relation to the other without the necessary movement of both.

The jaws $5^x$ and $5^y$ preferably are of semi-flexible steel, and when the jaws are not flexed, the dogs 9—9 are adapted to easily slide thereon, these dogs being provided with teeth $9^b$—$9^b$ along their inner-most sides, thus the dogs are adjustable to grasp various shapes of meat, or where the dog teeth might be injurious to the meat, they may be turned with the teeth downward so as to not hold it.

As the device is used, the pan 3 is set in the basin $2^f$ of the table 2, with the hole in the pan over the socket in the table. The leg 6 is set in the socket provided therefor and the jaws 5—5 are permitted to assume their natural position. The ham 10 is then positioned between the jaws with the teeth $9^b$—$9^b$ of the dogs aligned to grasp the sides of the meat. The jaw $5^y$ is then drawn against the side of the ham, and by the hasp 8 is pulled tightly against the meat until the ham is firmly held by the jaws of the vise. The meat is then ready for slicing.

As the slices are made they are laid in the tray 3, and when enough meat is cut, the jaws 5—5 are raised, holding the ham, and the pan with its contents is removed from beneath the ham.

It is thus seen that I have invented a device both practical and useful, as well as sanitary. And, due to the structure employed, if desired, a cover may be easily fitted over the whole, so as to rest on a-top the table 2.

It is of course understood that while I have shown and described and have pointed out in the annexed claims certain novel features of my invention, it will be understood that various omissions, substitutions and changes in the form and details of the device illustrated and its means of use may be made by those skilled in the art without departing from the spirit of the invention.

Having thus described my invention, what I claim is:

1. In a meat vise, a round table mounted on a base and adapted to revolve thereon, and rising from the table perpendicular thereto is an upright member to the upper extremity of which member is hinged a U shaped element of flexible metal, the U shaped element adapted to hold between its jaws a leg of meat, and at the extremity of the jaws of said element a hasp adapted to hold the jaws of the U shaped member at a predetermined distance one from the other, and attached the extremities of the U shaped member legs extending to the table.

2. In a device of the kind described, a round table mounted on a base and adapted to revolve thereon, and attached to the upper side of the table and at the edge thereof is an upright to the upper extremity of which is hinged a U shaped member of semi-flexible metal, said element adapted to hold a leg of meat, and the open end of said U shaped member closed by an adjustable hasp adapted to hold the arms of the U at a predetermined distance one from the other, and legs attached to and adjacent the ends of the U shaped member, said legs extending to the table and one of said legs slightly longer than the other, the longer leg adapted to fit in a socket on the face of the table and the shorter leg adapted to slide over the table surface.

3. In a device of the kind described a round table mounted on a base and adapted to revolve thereon and attached to the upper side of the table and at the edge thereof is a perpendicular member to the upper extremity of which is hinged a U shaped member of semi-flexible metal, said element adapted to hold in the jaws thereof a leg of meat, and the open end of the U shaped member closed by an adjustable hasp adapted to hold the jaws of the element at a predetermined distance one from the other, and legs at the extremities of the U shaped member, said legs extending to the table, and resting on the table a pan adapted to receive cuttings of meat.

4. In a device of the kind described a table mounted on a base and attached the upper side of the table and at the edge thereof an upright member, and hinged to the upper extremity of the upright member is a U shaped element and the open end of said member closed by an adjustable hasp adapted to hold the jaws of the U shaped element at a predetermined distance apart, and adjacent the ends of the U shaped element legs extending from said element to the table, and resting on the table a pan adapted to receive cuttings of meat, and one of said legs longer than the other the longer leg adapted to fit in a socket on the face of the table and the pan having a hole therein adapted to receive the passage of the leg past the pan to the socket.

5. In a device of the kind described a table mounted on a base and attached to the upper side of the table and at the edge thereof is an upright, and hinged to the upper extremity of said upright is a U shaped member adapted to hold between its jaws a leg of meat, the open end of the U shaped member closed by an adjustable hasp, and extending downward from said U shaped element to the table legs, resting on the table a pan, one of said legs longer than the other and adapted to fit a socket on the face of the table, and the pan having a hole therein adapted to receive the passage of the leg past the pan to the socket, said pan also being provided with a slot therein adapted to permit free movement of the shorter leg over the table surface.

6. In a device of the kind described, a table mounted on a base and attached to the upper side of the table and at the edge thereof is an upright member, and hinged to the upper extremity of the upright member a U shaped member, and along said U shaped member dogs, and a tie member closing the open end of the U shaped member and adapted to hold the sides of said member at a predetermined distance apart, substantially as set forth.

7. In a meat vise, a U shaped member of semi-flexible steel, a support member therefor and on either extenuation of the U shaped member dogs and an adjusting element adapted to maintain the sides of the U shaped member at a predetermined distance one from the other, substantially as set forth.

In testimony whereof I hereunto affix my signature.

JAMES M. BLACK.